May 31, 1927.  G. R. MEYERCORD  1,630,857
PLYMETAL PANEL AND WALL CONSTRUCTED OF THE SAME
Filed Aug. 12, 1922   3 Sheets-Sheet 1
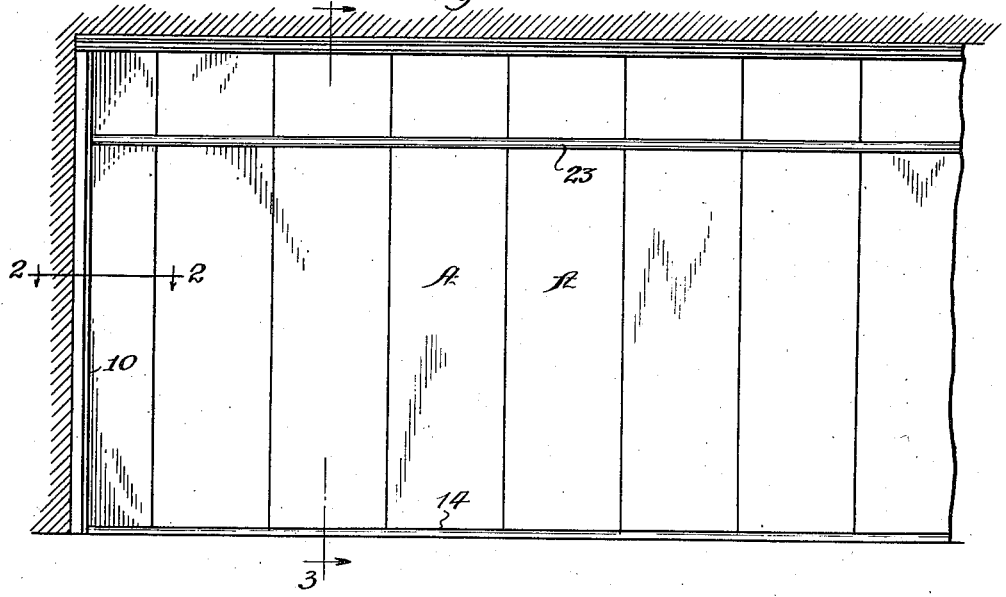
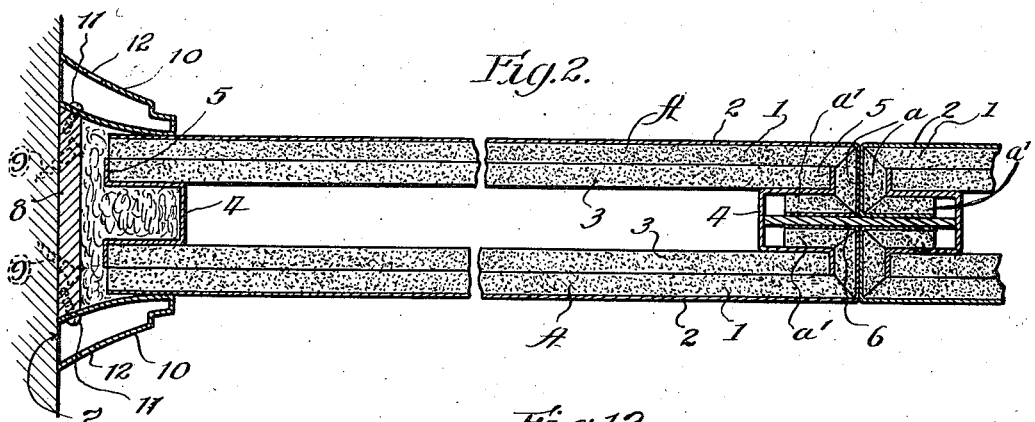
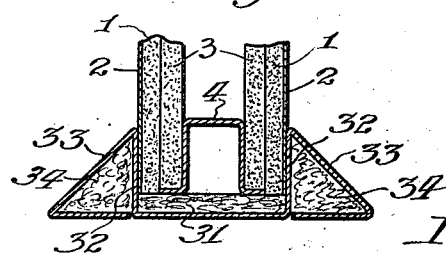
Inventor:
George R Meyercord,
by Wm. F. Freudenreich,
Atty

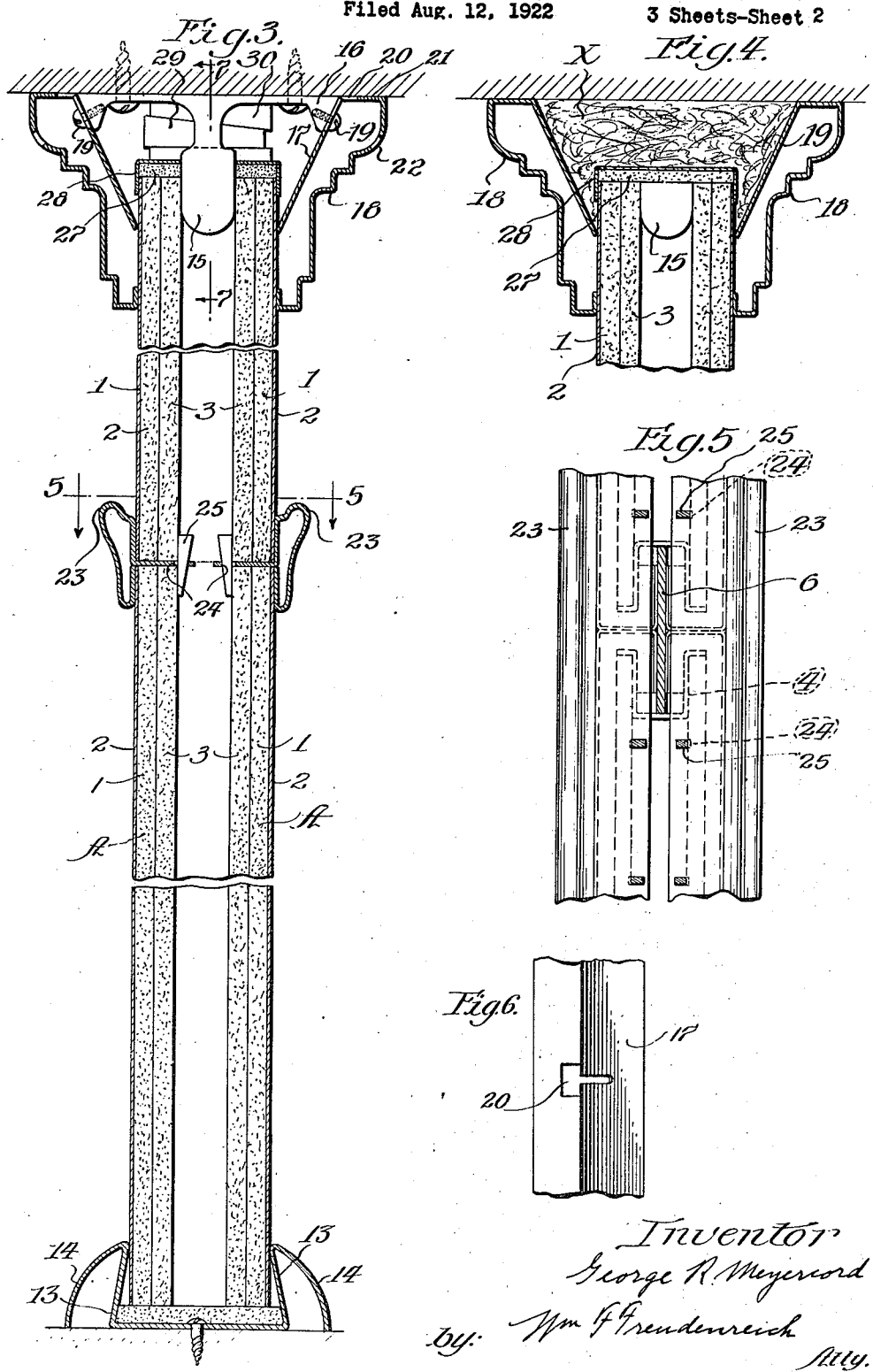

May 31, 1927.
G. R. MEYERCORD
1,630,857
PLYMETAL PANEL AND WALL CONSTRUCTED OF THE SAME
Filed Aug. 12, 1922  3 Sheets-Sheet 3
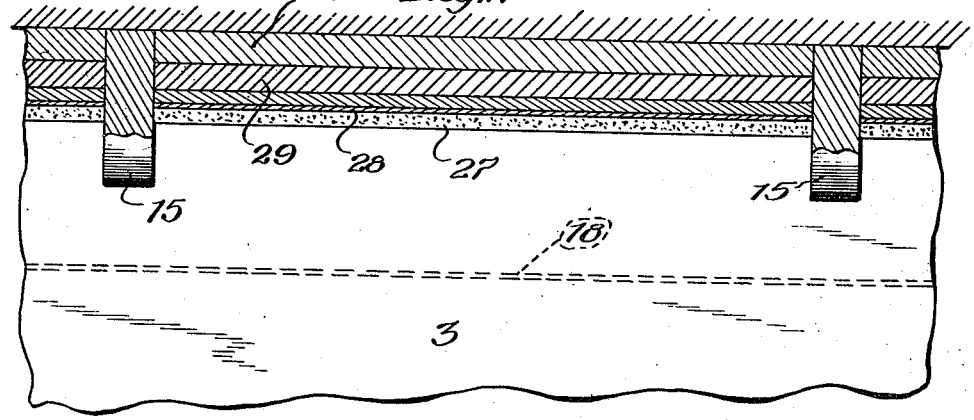
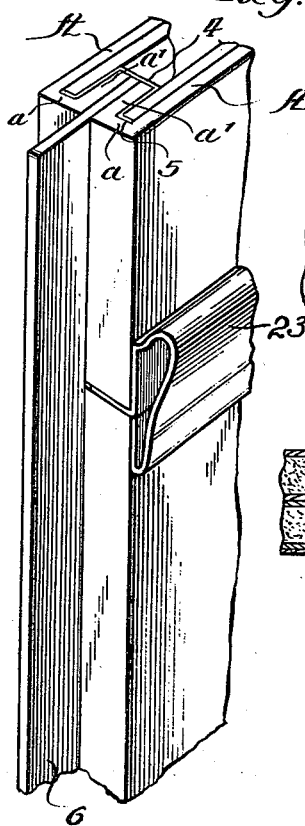
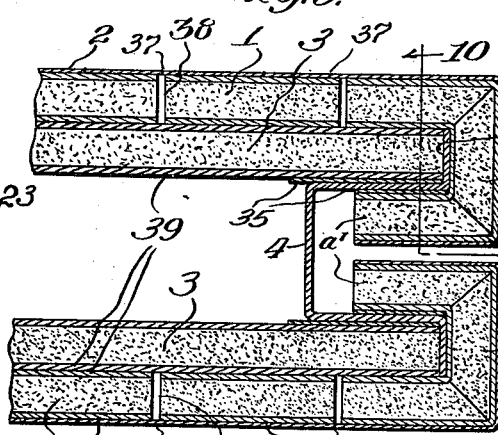
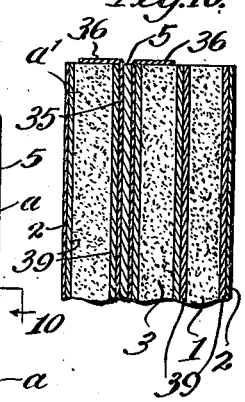
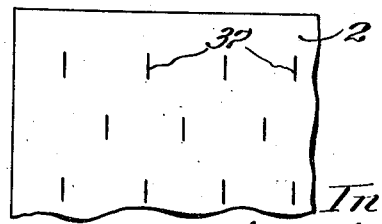

Patented May 31, 1927.

1,630,857

UNITED STATES PATENT OFFICE.

GEORGE R. MEYERCORD, OF CHICAGO, ILLINOIS, ASSIGNOR TO HASKELITE MANUFACTURING CORPORATION, A CORPORATION OF NEW YORK.

PLY-METAL PANEL AND WALL CONSTRUCTED OF THE SAME.

Application filed August 12, 1922. Serial No. 581,396.

My invention has for one of its objects to produce a fireproof metal-sheathed panel adapted to be put to a great variety of uses one of which is in the construction of walls or partitions in building structures.

In modern office buildings, for example, there is a constant rearrangement of the divisions of the floor space, causing walls to be torn down and new ones to be built at other places, marring the floors and ceilings and resulting in inconvenience and loss of time while changes are being made.

Viewed in one of its aspects, my invention may be said to have for its object to produce a simple and novel construction and arrangement which will permit a wall or partition to be established in but a small fraction of the time required to build ordinary walls or partitions; which will permit a wall or partition to be taken down quickly without damaging or destroying the constituent parts so as to prevent them from being used over again; which will avoid the dirt and confusion incident to building or destroying ordinary walls; which will avoid marring floors and ceilings when walls or partitions are moved or removed; and which will make it possible to secure good protection against fire.

Another problem in office buildings is the disposition of the many wires that are required for telephones, call systems and other purposes and which are being constantly shifted around and changed; such wires being usually left exposed and detracting from the neatness of a room in which they are found. A further object of the present invention is to produce a simple and novel wall construction which will afford space in which wires may be housed and which will permit the wires to be laid around a room or up and down a wall in a simple and convenient manner without leaving the wires exposed.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is an elevation of a part of a wall or partition built up in accordance with my invention;

Fig. 2 is a section on an enlarged scale taken approximately on line 2—2 of Fig. 1;

Fig. 3 is a vertical section on an enlarged scale of the wall, taken approximately on line 3—3 of Fig. 1;

Fig. 4 is a view similar to Fig. 3, only the upper end of the wall being shown, and the section being taken on a different vertical panel;

Fig. 5 is a section taken approximately on line 5—5 of Fig. 3;

Fig. 6 is a plan view of a fragment of one of the ceiling moldings;

Fig. 7 is a section on line 7—7 of Fig. 4;

Fig. 8 is a perspective view of a fragment of one of the panels, showing the two sections of which it may be made;

Fig. 9 is a transverse section, on a larger scale than the other sections, through a wall panel adjacent to an edge thereof;

Fig. 10 is a section taken approximately on line 10—10 of Fig. 9 showing the upper portion of the panel;

Fig. 11 is an elevation of a fragment of the panel shown in Fig. 9, on a smaller scale; and Fig. 12 is a section similar to Fig. 3, only the lower end of the wall being shown, and the construction being a modification of that shown in Fig. 1.

My invention is based on the use of panels made up of several sheets of heat-resisting material and a facing of thin sheet metal, which I shall designate by the general term "plymetal". In the arrangement shown each panel is made up of four distinct sections arranged in pairs spaced apart from each other and connected together at the margins by means of suitable holding and spacing pieces and, for the sake of brevity, I shall confine the detailed description to this particular construction of panel, although it will be understood that the panel may be built up in various other ways. The general construction of the panel is perhaps best shown in Fig. 2. Referring to this figure it will be seen that the two outermost sections are each made up of a thick sheet or body 1 and a thin facing sheet 2. The members 1 are preferably constructed of a material having high heat-resisting qualities while the facing sheets are made of metal, preferably galvanized iron glued or cemented to the members 1. The side marginal portions of the composite outer sections are bent laterally at right angles to the plane of the section and then inwardly. This may conveniently be accomplished by making V-shaped excisions through the sheets 1 along lines parallel with the side edges and properly spaced apart from each other and from said side edges; the excisions extending downwardly to the metal so that the panel member is bent along the lines of the bottoms of the excisions, and the bending all takes place in the metal. The excisions are preferably so shaped that when the folds or bends are completed, there will be at each side edge of the section two right angled bends. Thus, indicating the compound member made of the sheets 1 and 2 by the letter A, it will have a deep side edge, a portion $a$ extending at right angles thereto and a portion $a'$ extending at right angles to the portion $a$ and parallel with the body portion of the member A. The parts are also so proportioned that the distance between each part $a'$ and the body of the section will be slightly greater than the thickness of a sheet 3 of heat-resisting material, thus forming at the sides of each section $a$ two grooves that face each other and are adapted to receive a sheet 3 having a width slightly less than the distance between the bottoms of the grooves. Two of the compound members, each composed of a member $a$ and a member 3, are placed with the members 3 facing each other and they are then locked together by means of channel-shaped spacing pieces 4, preferably of metal which fit between the members 3 and have their main flange extending between these members and the adjacent folded-in portion $a'$. The main flanges of the channels are provided with auxiliary flanges 5 extending outwardly therefrom at the free ends thereof and of substantially the same width as the thickness of one of the members 3; these auxiliary flanges lying between the side edges of the members 3 and the adjacent element $a$. The interior width of the channels is somewhat greater than twice the thickness of one of the members $a$ so that the parts $a'$ at each side of the completed panel will be spaced apart from each other and thus form in each side edge of the panel a central slot extending from one end of the panel to the other. It will be seen that after the channels have been placed in position, the four separate sections of the panel are interlocked with each other against displacement in any direction except parallel with the length thereof. Consequently, when such a panel is placed in an upright position between a floor and a ceiling, which prevent displacement of the elements of the panel in a vertical direction, the panel constitutes a rigid hollow heat-resisting structure faced on the broad surfaces and on the side edges with metal. In building a wall out of such panels, adjacent panels are interlocked with each other and openings through the wall at the joint are prevented by means of long flat metal keys 6 fitting into the registering slots or grooves at the meeting edges of the panels.

The panels will usually be made in one or more standard widths so that it will frequently happen that a wall cannot be built completely of full sized panels but must have one panel which is narrower than the other. Where this occurs, the panel which is to lie next to the wall at right angles thereto has a piece cut away on one side so as to make the panel of the proper width to fit in the available space. Such an arrangement is illustrated in Fig. 2 wherein the left hand panel has been cut away at the left hand end, thus removing the interlocking connection between the two double walls at this point. The two double walls may be held in proper spaced relation to each other by inserting between them one of the channels 4 the auxiliary flanges 5 of which engage with the raw outer edges of the panel elements 3. The channel prevents the two double walls from approaching each other but does not hold them against spreading. The spreading of the double walls may be prevented by the means used for attaching the panel to the wall at right angles thereto. Thus, in the arrangement shown in Fig. 2, there is fastened to the main wall 7 of the building a vertical cleat 8 lying just opposite the adjacent end of the mutilated panel. This cleat is preferably held in place by means of screws 9 or other fastening means extending through the same at such an angle and in such positions that they may be inserted after the partition wall has been set up, thus affording additional clearance between the main wall of the building and the end of the last panel when the latter is placed in position. After the cleat has been secured in place, metal moldings such as indicated at 10 are fastened to the opposite edges thereof, these moldings engaging with the opposite faces of the panel and not only holding the panel in place but preventing the double walls thereof from spreading. The moldings are preferably made hollow so as to provide dead air spaces within the same to prevent a rapid transference of heat past the moldings. The moldings are conveniently formed out of sheet metal bent upon itself along a longitudinal line, so that they may be fastened to the cleat by means of screws 11 passing through the inner legs or flanges. In order that access may be had to the screws, the outer legs or flanges of the moldings are provided with holes 12 opposite each screw hole; the holes 12 permitting screw drivers to be inserted for the purpose of turning the screws.

The connections between the lower ends of the panels and the floor and ceiling may be made in various ways. The lower ends of the panels may simply be set into a combined trough and cove 13 secured to the floor of the building as shown in Fig. 3. The member 13 may be made out of sheet metal bent to form a trough somewhat narrower at the top than at the bottom, the side walls having at their free edges flanges 14 bent outwardly and downwardly. Thus, there will be provided an air space between the major portion of each side wall of the trough and the panel, and another air space between each side wall and the outlying flange. The normal width of the mouth of the trough may be made somewhat less than the thickness of the panel so that the sides of the trough must be sprung apart somewhat to permit the insertion of the panels, serving thereafter to grip the panels with a spring pressure.

I prefer to make the connection between the top of the panels and the ceiling in such a way that the panels need not extend into contact with the ceiling, thus avoiding the necessity of making nice adjustments which will increase the cost of installation, and at the same time permitting access to be had to the interior of the hollow wall so as to permit electrical wires to be dropped down through the wall to suitable outlet or terminal points. Furthermore, I desire to provide means in the connection between the panels and the ceiling for housing and concealing wires running horizontally along the wall or partition formed by the panels. In the arrangement shown in Figs. 3 and 4, there are a number of stops or projections 15 fastened to the ceiling along the center line of the top of the wall or partition to be formed; the members 15 having parts whose dimension at right angles to such wall or partition is equal to the distance between the inner layers 3 of one of the panels. The members 15 are arranged at intervals, as shown in Fig. 7, perhaps two of them being used for each two-foot panel. The panels must be long enough so as to permit the members 15 to project into the upper ends thereof. Hollow moldings or coves are placed in the angles between the panels and the ceiling, one on each side of the panels. These coves or moldings may conveniently be secured to the side edges of the bases 16 of the members 15. In the arrangement shown, each ceiling molding or cove is made up out of sheet metal bent to form a hollow structure, having an inner wall 17 engaged with the base 16 and with the adjacent side of the panel, and with an outer wall 18 extending downwardly from the ceiling to the side or face of the panel and possessing any suitable ornamental configuration. The coves or moldings may conveniently be held in place by means of screws 19 passing through the inner wall 17 and into the member 16. In order to permit the screws to be placed in position before the moldings are applied, each molding may be provided with a key-hole slot 20, the large portion of which is contained in a narrow connecting wall 21 between the upper ends of the walls 17 and 18 and adapted to lie in contact with the ceiling, while the narrow portion of the slot extends downwardly into the wall 17. The large portion of the slot is of sufficient size to permit the passage of the head of the fastening screw while the narrow portion of the slot has a width only slightly greater than the diameter of the shank of the screw. The projections or brackets 15 are spaced apart the same distance from each other as the spacing between the key-hole slots in the coves. Then, after the partition has been set up, the screws 19 are inserted in the bases of the brackets with the heads spaced apart from the adjacent surfaces of the brackets a distance slightly greater than the thickness of the metal of which the moldings are made. Then the moldings are moved upwardly from below along the partition toward the ceiling, the screw heads passing through the large portions of the key-hole slots and permitting the shanks of the screws to enter the narrow sections of the slots. The screws may then be tightened by means of a screw driver inserted through holes 22 located in the outer walls 18 of the moldings opposite the key-hole slots.

Wires may be housed within the moldings or in the space between the moldings above the panels, and leads may be dropped down through the interior of the panels to wall or floor connections.

Since the distance between floor and ceiling varies greatly in different buildings and is sometimes greater than it is advisable to make the length of single panels, a wall may be built up out of panels arranged one above the other as well as side by side. In the arrangement shown in Figs. 1, 3 and 5 each panel is made in two sections one above the other, the joint between the upper and the lower panels being either along the line of a chair rail or a picture molding, a picture molding being shown in Fig. 1. The only new element involved in such a construction is the connection between the upper and lower panels so as to insure perfect alignment and the absence of visible joints or passages through which heat or gases could readily pass. To this end I make use of moldings 23 which are preferably made of sheet metal bent to form a structure T-shaped in cross section, the head of the T being hollow while the stem is a single flat strip somewhat greater than the thickness of one of the double walls of the panel. The flat or stem portion of each molding is provided with holes 24 placed at intervals and spaced apart from the inner side of the head a distance slightly less than the thickness of one of the double walls of the panel. In assembling an upper and a lower panel, two of the moldings are laid on top of the lower panel with one arm or wing of each head extending downwardly and engaging with the outer face of the panel while the other arm or wing of each head projects upwardly. The upper panel is then placed in position, resting at its lower end on the two stems or flanges of the molding. Wedges 25 are then dropped down into the holes 24 in the moldings and, when they are driven tight, will clamp the marginal portions of the two double walls of the two panels between the wedges and the heads of the moldings; thus securing perfect alignment of the upper and lower panels. This arrangement can be used very successfully where the moldings are picture moldings, because the wedges will rarely be located more than eighteen inches from the top of the wall and can therefore be readily inserted. Where upper and lower panels are used, I prefer not to use separate keys for fastening together the upper panels and the lower panels but, instead, employ keys which, as shown in Fig. 8, are long enough to reach from the bottom of the lower panels to the top of the upper panels, thus insuring accurate registration between the meeting edges of the panels and interlocking the upper and lower panels together so that they will present the same even surface as though single panels extended from floor to ceiling, interrupted only by the picture or chair molding.

It will be seen that in case a flame strikes against one side of a wall made up as heretofore described, the heat will be transferred to the opposite side only very slowly even though the metal facing on the exposed side quickly becomes red hot. It will further be seen that the thickened marginal portions at the side of each panel act as strong supporting posts or columns so that each panel may be said to consist of two fire-resisting double walls spaced apart from each other and supported at the side edges by strong posts or columns. Therefore, in the event of a fire on one side of a wall made in accordance with my invention, the wall would long resist the passage of flames but, if one of the double walls should eventually be completely broken down, the other double wall would still remain as a barrier and would retard the progress of the flames until it in turn had been destroyed.

If the fire-resisting sheets be made out of commercial plaster board which is formed largely of gypsum, it has been found that a comparatively small amount of woody matter contained in the same will be volatilized under the influence of intense heat and, unless extreme care is taken in the building of the wall, the gases so formed may be discharged into portions of the building that have not yet been reached by the flame, creating a condition which is objectionable in many ways. I therefore prefer to seal the ends of the panels so as to prevent the gases which may be evolved in the wall from flowing out at the ends of the panels and escaping through the moldings. In the arrangement shown in Figs. 3 and 4 I have placed across the top of each panel a layer 27 of asbestos or other suitable fireproof material which will not give off gases, covering the same, if desired, with an inverted channel 28 of metal; the members 27 and 28 having therein holes just large enough to permit the stops or projections 15 to pass through the same. Above this covering may be placed wedge blocks 29 and 30 each as long as the space between consecutive stops or projections 15 and of a width approximately equal to the thickness of one of the panels. It will be seen that when these blocks are placed in position, they will serve to press the closing cap firmly down on top of the panels, preventing gases evolved within the panel from rising out through the top thereof, and at the same time will wedge the panels firmly between the floor and the ceilings. If desired, the space between the mouldings, above the top of the panels, may be filled with mineral wool or other material of heat resisting and nonconducting material, as indicated at X in Fig. 4. If a more effectual sealing of the lower end of the panels be desired than is afforded by the mere wedging of the same down upon the floor, the construction shown in Fig. 12 may be employed at the lower ends of the panel. In this construction the panel rests upon a sheet of soft asbestos board 31 lying within the metal trough 32 which embraces the lower marginal portion of the panel. Flanges 33 extend diagonally outwardly and downwardly from the upper edges of the trough, to the floor, and then are bent inwardly so as to form on each side of the trough two hollow coves approximately triangular in cross section. The interior of the coves may be filled with loose asbestos or other material which is fireproof and a poor conductor of heat, so that in case of fire the heat will not be transmitted rapidly from the outer metallic surface of a cove to the adjacent inner flange of the trough. In this figure I have also illustrated a means for spacing the double walls of a panel apart between the side edges of the panel, this means consisting of a short section of the channel 4 heretofore described.

A convenient material for use as the heat-resisting sheets forming the double walls of the panel is of the type known commercially as "sheet rock", which consists of a thick layer composed mainly of gypsum, faced on both sides with heavy paper. A portion of a panel made up of this material is shown in Figs. 9, 10 and 11. I have found that a difficulty arises when the long channels are inserted to lock the two double walls together, in that the channels rub fragments off the surface of the comparatively rough paper and roll the fragments into balls or wads which not only interfere with the positioning of the channels but may result in injury to the product if the channels are forcibly driven into position. In order to prevent this condition from arising, I lay along the inner face of each of the parts $a'$ of the panel members and along the adjacent marginal portion of each of the panel members 3 which faces the corresponding part $a'$, a thin metal strip or tape 35, somewhat longer than the panel so that the ends may be bent laterally as indicated at 36. In this arrangement the main flanges of the channel lie between and are engaged by the metal strips or tapes and do not come in contact with the paper when the channels are put in place. Furthermore, the strips serve as tracks or slides on which the weight of each of the panel members 3 may rest when that panel member is slipped into the cooperating panel member 1.

Where the heat-resisting sheets are covered with paper there is of course more material which will be volatilized by the intense heat of a fire, than where no paper facings are employed, and even where the precautionary measures heretofore described are used, considerable quantities of gases may find their way out into the space lying on the cool side of the wall. I therefore prefer to provide means which, in case of fire, will permit gases that are formed within the wall to be discharged on the hot side easily enough to insure that the amount that will escape on the cool side will be small. To this end I perforate each of the metal facing sheets at a large number of points, in such a manner that the sheets will normally have the appearance of having uninterupted surfaces, while in case of fire openings will be afforded for the passage of gases. The perforations are preferably in the form of elongated slits 37. Under the influence of heat, the glue between the metal and the heat-resisting material on the hot side of the wall will come into a condition which will permit the metal sheet to bulge away from the material to which it has been attached, under pressure from the inside. The result is that gases will find their way to the inner side of the hot sheet, causing the same to bulge outwardly and, the paint or enamel which has concealed the slits having been burned away, the gases will pass out through the slits into the fire. In order to permit the gases from the inner sheet 3 on the hot side to pass freely outwardly to the corresponding metal sheet, I prefer to fill the sheets 1 with perforations as indicated at 38, extending entirely through the same. The gases evolved in the two paper sheathings 39 where the sheets 1 and 3 engage each other, can therefore pass readily through the sheet 1 to the corresponding metal facing. As heretofore explained, the double wall on the opposite side from that at which the fire is located will remain cool for a long time; so that the gases during such a fire will be evolved chiefly from those walls or sheets next to the fire and will find outlet through the corresponding slitted metal in contact with the flame; the slits on the opposite side remaining closed and therefore not forming a means of exit for the gases.

While I have illustrated and described with particularity only a single preferred form of my invention, with a few small modifications, I do not desire to be limited to the exact structural details thus illustrated and described; but intend to cover all forms and arrangements which come within the terms employed in the definitions of my invention constituting the appended claims.

I claim:

1. A panel composed of opposed metal-faced compound sheets held in spaced relation to each other by interposed spacing strips, said sheets being folded inwardly upon themselves at opposite sides.

2. A panel composed of opposed metal-faced sheets held in spaced relation to each other by spacing strips, said sheets being folded inwardly upon themselves at the sides so as to produce thick marginal portions, the spacing strips being of such width that the marginal portions of the sheets at each side of the same are spaced apart to form grooves or slots extending between the thickened marginal portions throughout the length of the panel.

3. A panel composed of opposed sheets each containing an outer layer of metal and an inner layer of material which is fireproof and a poor conductor of heat, said sheets being held in spaced relation to each other by spacing strips, said sheets being folded inwardly upon themselves at opposed edges so as to produce thick marginal portions, said strips being of such thickness that the thickened marginal portions at each side of the sheet are spaced apart to form grooves or slots extending throughout the length of the panel.

4. A panel composed of two walls having at opposed edges inwardly-directed portions spaced apart from the body portions to form inwardly-directed grooves, and channel-shaped spacing members lying between said walls and each having its flanges lying in the grooves at one of the sides of the panel.

5. A panel composed of two walls each comprising a sheet of heat-resisting material and a second sheet lying on the outer side thereof and folded at its side edges past the edges of the first sheet and inwardly across the same, and channel-shaped spacing members lying between said walls and each having its flanges lying between the first mentioned sheet and those portions of the other sheets that overlie the inner sides of the inner sheets.

6. A panel composed of two walls each comprising a sheet of heat-resisting material and a second sheet lying on the outer side thereof and folded at its side edges past the edges of the first sheet and inwardly across the same, and channel-shaped spacing members lying between said walls and each having its flanges lying between the first mentioned sheet and those portions of the other sheets that overlie the inner sides of the inner sheets, said channel-shaped member having auxiliary outwardly-directed flanges along the free edges of the main flanges, said auxiliary flanges engaging with the edges of the inner sheets.

In testimony whereof, I sign this specification.

GEORGE R. MEYERCORD.